May 27, 1941.  A. N. ANDERSON  2,243,074
INDICATOR MEANS
Filed April 4, 1938
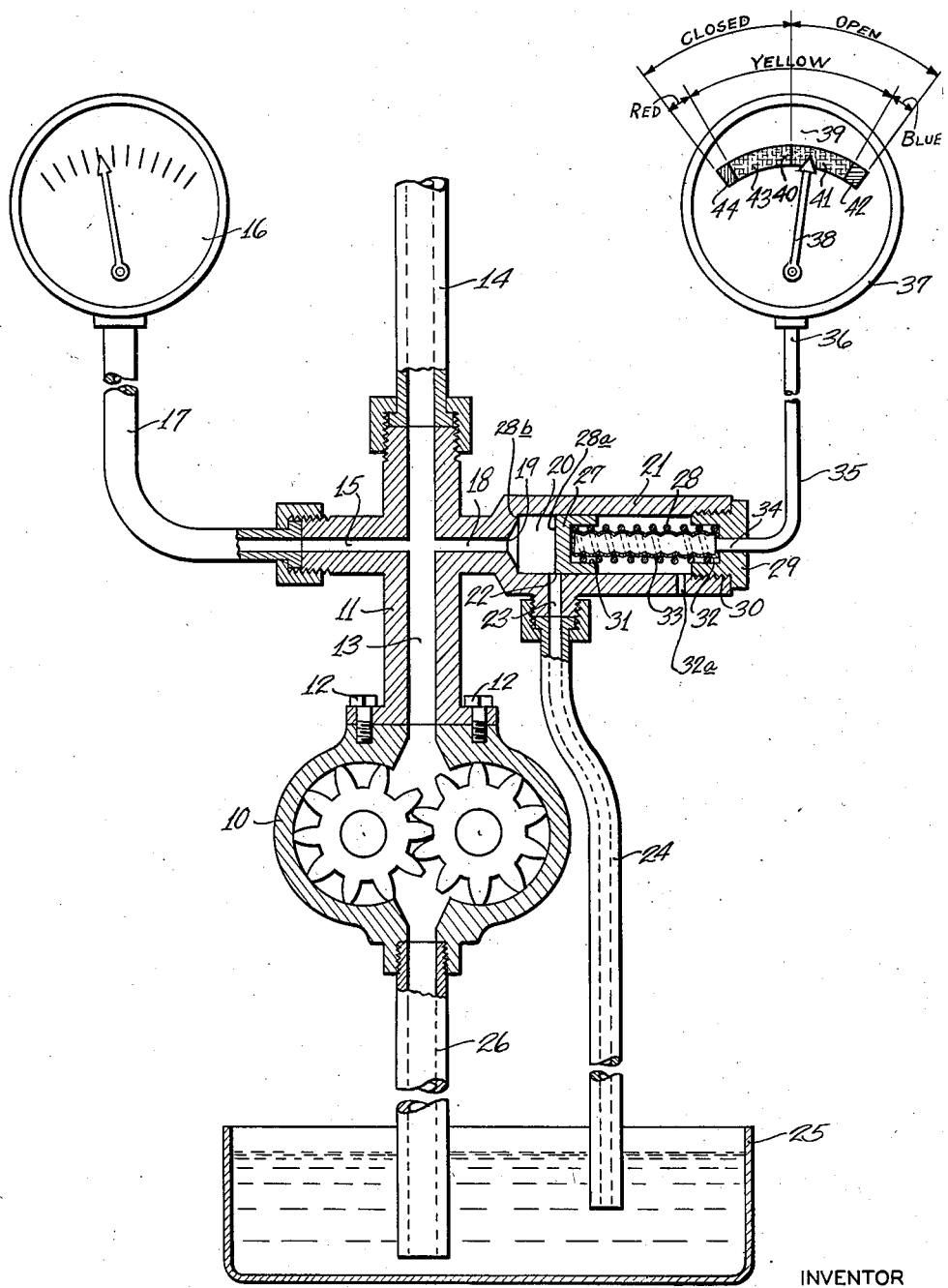
INVENTOR
ARNOLD N. ANDERSON
BY Paul L. Krohn
ATTORNEY Patented May 27, 1941

2,243,074

UNITED STATES PATENT OFFICE 2,243,074

INDICATOR MEANS

Arnold N. Anderson, Chicago, Ill.

Application April 4, 1938, Serial No. 199,963

2 Claims. (Cl. 116—125)

This invention relates to an operating condition indicator means for internal combustion engines and the like, and more particularly to a means for visually indicating functional conditions in the engine lubricating system and more especially operating conditions of the engine bearings in respect to abnormal wear or impending failure.

The indicating means forming the subject of the present invention, is particularly adapted to internal combustion engine lubricating systems of the type employing a positive displacement pump for forcibly delivering lubricating oil, as from a suitable source of oil supply such as the engine crankcase sump, to the engine bearings and other parts requiring positive oil feed. In the force feed type of lubricating system, it is common practice to utilize a pump which will deliver a quantity of oil in excess of normal engine requirements and further to provide on the delivery side of the pump, a suitable by-pass connection capable of passing the excess oil back to the supply side of the pump. The usual by-pass connection employed includes a spring loaded by-pass valve plunger controlling the by-pass port, and being actuated in response to the pressure-differential of the valve spring and the lubricating oil supplied to the engine. It is also usual practice in such systems to include an oil pressure gauge at some point in the oil distribution system, to provide an indication of the oil pressure therein. In prevailing practice, this oil pressure gauge serves as the sole means for indicating lubrication oil pressure and thus indirectly oil flow conditions within the engine lubricating system, but in certain instances, as in the case of abnormal bearing wear, the pressure gauge fails as a reliable indicator of such condition for the reasons hereinafter to be noted.

In force feed lubricating systems of the type noted, particularly as applied to high speed engines, a major defect in the oil delivery system, such as a break in the oil line or pump failure, will result in a sudden and substantial drop in the oil pressure and this pressure drop will be registered immediately by the oil pressure gauge. But in the case of bearing obstruction as from a collection of dirt, oil, carbon or other foreign matter, the bearing clearances may be considerably reduced, hence obstructing the normal flow of lubricating oil through the bearings. As a result, the oil pressure in the distribution system will increase, but through the operation of the by-pass connection the excess pressure will be relieved, thereby tending to restore the normal pressure in the delivery lines. This function of the by-pass to relieve the excess pressure is of such a nature that the oil pressure rise may never be registered by the oil pressure gauge, hence the engine operator reading the gauge may assume that the engine is operating normally whereas actually there may exist an abnormal bearing condition. The same result will obtain in the case of too tight bearings or where a too heavy grade of lubricating oil is used, as the same pressure relief action will occur at the by-pass connection. Hence, it will be apparent that under the above noted conditions, as clogged or tight bearings or use of too heavy oil, the ordinary oil pressure gauge employed in the system will not indicate the true conditions at the bearings.

The inadequacy of the main oil pressure gauge to indicate certain functional conditions in the lubricating system as pointed out above, applies also to conditions of excessive oil flow to the bearings, such as may result for example, from abnormal bearing wear producing large clearances, oil leakage through cracked bearings, bearing failure or other abnormal conditions short of a full break in the oil feed system. In such cases, the full capacity of the oil pump may be called upon in an effort to maintain normal bearing lubrication, and it is in such cases that the by-pass valve operates to reduce the quantity of oil by-passed or even to completely cut off oil by-pass, in an effort to maintain normal pressure in the oil delivery system. It is evident, therefore, that normal pressure may be indicated by the main pressure gauge even after the by-pass has been fully closed for some time or until a major bearing failure occurs, when an appreciable drop in oil pressure will be registered by the main gauge. Accordingly, too great a reliance cannot be placed upon the main pressure gauge to give an indication of bearing wear short of a major failure, during engine operation.

It will be observed from the foregoing discussion, that in the event of abnormal conditions of lubricating oil flow and pressure conditions with respect to the bearing function, as noted hereinabove, the by-pass valve functions in response to oil flow and oil pressure changes resulting as such abnormal conditions occur, in a manner tending to restore the normal pressure condition of the system. Hence it becomes apparent that movement of the by-pass valve provides a direct and positive indication of such conditions, registering in its operation to by-pass more or less oil as one or another abnormal condition occurs in oil flow and bearing function, the tendency for such condition or conditions to become worse or to become rectified during engine operation. Accordingly, it is the principal purpose of the present invention to provide an arrangement utilizing by-pass valve movement to give a visual indication either adjacent the engine or at some remote point, as a remote engine control station, of oil flow and bearing wear conditions.

Another object of the present invention is to provide a device for indicating conditions of bearing wear in a more accurate manner than has been possible heretofore, as by reading the main oil pressure gauge.

Another object of the invention is to provide an indicating arrangement serving as a means for determining wear conditions of the bearings during engine operation, the arrangement including mechanism of simple and relatively trouble-free nature, functioning for the purpose noted, to visually indicate movements of the by-pass valve in its pressure-responsive action during engine operation.

Other objects and advantages of the present invention will be evident to those skilled in the art as the description proceeds and from the accompanying drawing which illustrates a preferred embodiment of the invention as applied to the lubricating system of an internal combustion engine.

In the drawing, 10 represents generally a fluid displacement device or pump of the positive delivery type, provided for delivering lubricating fluid, as oil, to a fluid circulating system associated with an internal combustion engine or the like. In the present example, a conduit connection or fitting 11 is arranged on the fluid delivery side of the pump, being attached to the pump casing by suitable bolts 12. The fitting provides a main oil flow passage 13 leading to a distribution conduit 14; a branch passage 15 in fluid connection with a main fluid pressure gauge 16, as through a conduit 17, and a second branch or by-pass passage 18 opening through a port 19, into a by-pass valve chamber 20 in a housing 21. Extending laterally through a wall portion of housing 21 and opening into chamber 20 through a port 22, is a passage 23 which communicates at its outer end with a conduit 24 leading to an oil sump 25. Sump 25 may be a part of the crank case structure of an engine (not shown), providing a supply of lubricating oil for the engine bearings, etc. Accordingly, the suction side of pump 10 may be connected with the sump through a conduit 26.

Disposed within the chamber 20 is a by-pass port-controlling valve 27 of piston type, which is spring-loaded as by a suitable compression spring 28. The piston is formed to provide a flat or plane operating face 28a, while the inner wall of the housing 21 defining the inlet port 19, is of conical form, providing at its periphery within chamber 20, an annular shoulder 28b against which the face of the piston abuts when the latter is displaced toward port 19. Thus in such position of the piston and by reason of the conical wall surrounding the port 19, the oil in the passage 18 may contact substantially the full area of piston face 28a and hence exert its pressure uniformly over the piston face. The outer end of the chamber 20 is closed by an element or plug 29 which threadedly engages the housing 21, as at 30. Both the valve and plug are axially recessed, as at 31 and 32 respectively, in which are seated the ends of the spring 28. It is to be noted that the by-pass ports 19 and 22 are arranged so as to be controlled as to their open or closed condition, by the valve 27. Spring 28 serves to urge the valve toward port-closing position and against the pressure of the oil in passage 18, valve displacement being responsive to variations in the pressure-differential of the valve spring and the oil in by-pass 18.

As a means for venting such oil as may leak past the valve piston and into the valve spring chamber, being the space between the valve and plug 29, a small vent passage 32a is provided through the wall of housing 21 adjacent the plug 29. This passage which is open to atmosphere so that air may enter or be expelled from the spring chamber as the valve is actuated, permits oil collecting in such chamber to drain therefrom, the oil thus drained being returned to the sump 25 for recirculation. Accordingly, the vent 32a effectively prevents a fluid pressure condition occurring in the spring chamber by reason of leakage oil collecting therein or by air entrapped therein.

Visual indication of the extent of by-pass valve movement is provided for by a fluid displacement mechanism in association with a suitable gauge of a fluid displacement type. A preferred form of such mechanism is illustrated, being comprised of a Sylphon type bellows structure 33 arranged so as to be encircled by the spring 28 and having its ends seated in the recesses 31 and 32. The bellows contains a suitable fluid such as oil, and is in fluid communication with one end 34 of a conduit 35, the conduit end 34 connecting with the end of the bellows in plug recess 32. The opposite end 36 of conduit 35 is connected to a fluid type gauge 37, being operatively associated with a fluid-displacement responsive element (not shown) within the gauge, which serves to actuate a gauge arm or pointer 38 on the dial face 39. Cooperating with the pointer 38 is an arcuate color-band formed on the dial face, the band being divided by a vertical line 40. The right-hand portion of the band comprises a section 41 of substantial arcuate extent and an end section 42 of lesser arcuate extent, while similar sections 43 and 44 are provided for the left-hand band portion. As indicated on the drawing, the sections 41 and 43 are by preference colored yellow, while the end section 42 is colored blue and the end section 44 colored red. The sections 41 and 42 indicate "open" conditions of the valve, while the sections 43 and 44 indicate "closed" conditions thereof.

The gauge is calibrated with respect to the valve 27 such that when the valve just closes the by-pass port 22 (the port 19 being full-open), the hand 38 will register with the vertical band-dividing line 40. As the valve is displaced to open port 22, the pointer will move over band sections 41 and 42, depending upon the extent of valve-opening movement; while when the valve closes port 22 and is displaced toward or away from port 19, the pointer will move correspondingly over the band sections 43 and 44. Further, the calibration of the indicating mechanism is such that positions of the pointer within the yellow band sections, either on the open or closed sides, indicates normal functioning of the oil feed system, while any disposition of the pointer over the red or blue band sections indicates an abnormal condition in the system, as excessively tight bearings when the pointer registers in the blue section, or excessive bearing wear when the pointer registers in the red section. This will appear more clearly from the following examples of the function of the indicator system.

Considering first the normal function of the arrangement, since the pump 10 is of a capacity to deliver lubricating oil at a pressure in excess of that normally required at the bearings, etc., the excess oil will be relieved through the by-pass, the valve 27 being displaceable responsive to the pressure-differential of the spring 28 and the pressure of the oil in the by-pass passage 18 and chamber 20, to open the by-pass port 22, whereby the excess oil is permitted to flow back to the supply sump 25. As the pressure at the bearings and other points of engine lubrication tends to vary within normal limits, the valve plunger 27 is displaced to open or close the port 22. This results in the valve compressing or relieving the bellows structure 33 which in turn, produces a corresponding movement of the gauge hand 38 over the yellow bands, either on the "open" or "closed" section thereof. In this example, the function of the by-pass is such as to tend to restore the pressure of the oil in the feed line 14 to a normal, substantially constant value as predetermined for a given installation. Hence, as the by-pass is more or less successful in maintaining a constant pressure in the feed line, the main gauge 16 will indicate substantially only the normal pressure in the line 14. From this it will be observed that while the main gauge is registering substantially normal pressure in line 14, the by-pass valve gauge may have its pointer 38 at some point, say in the yellow band section marked "closed". While in such yellow band, the extent to which the pointer approaches the band-sector 44 colored red indicates for example, a bearing-wear condition at one or more of the engine bearings which though within normal permissible limits as long as the pointer registers in the yellow band, may become worse during continued engine operation. In the above example, with the pointer in the "closed" yellow band, the by-pass is of course closed at port 22, indicating that all of the oil delivered by the pump is flowing to the engine bearings, etc. but by reason of some bearing wear, the oil flows more freely through them and hence the oil pressure may remain substantially normal, as registered by gauge 16.

Continuing the above example, as bearing wear becomes abnormal, the valve 27 will approach and close port 19, resulting in movement of pointer 38 into the red band sector. While some pressure-drop may be recorded by main gauge 16, the position of the pointer 38 in the red band indicates immediately an abnormal condition of the bearings, as abnormal bearing-wear or cracked bearings. Such function of the by-pass valve gauge may be relied upon then, as indicating a bearing condition which needs immediate attention.

The operation described for the example of bearing wear, applies in a similar manner to conditions of clogged bearings or feed lines, but in this case, the by-pass valve gauge will register in the valve-open color bands. For example, should the bearings be clogged by foreign matter or carbon deposits, the pressure in the feed line 14 will tend to increase. The increased pressure will be relieved through the by-pass, the valve 27 being displaced to open port 22. If the clogged condition of the bearings is not too severe, the by-pass release of the pressure-excess may serve to restore the pressure in line 14 to substantially normal value, and this will be indicated by main gauge 16. But as the condition becomes excessive or abnormal, the valve 27 may be displaced considerably beyond its position required to effect a full-open condition of the port 22, to a position wherein the arm 38 of gauge 37 registers in the blue band-sector 42. This again indicates abnormal conditions at the bearings, which require immediate attention if the engine function is to continue without damage to the bearings.

From the foregoing it will be evident that the arrangement described provides a visual indication of the functional operation of the engine in respect to bearing wear and lubricant pressures, and this in a positive manner and sufficiently in advance of the indication by the main gauge 16 of abnormal oil pressure drop or rise as to give the engine operator ample time to take the proper steps to correct the fault or to stop the engine before damage occurs.

It will be understood that the application of the indicating means is not limited to internal combustion engines, but may be applicable to other apparatus wherein a similar pressure equalizing by-pass mechanism is utilized. It will be evident also that certain modifications can be made in the structure and arrangement of the indicating mechanism without departing from the spirit and scope of this invention as defined by the appended claims.

I claim:

1. An indicator device of the character described, for use with a fluid-pressure responsive valve controlling a fluid port and wherein the valve is displaceable substantially beyond merely a full-open or full-closed position relative to the port, the indicator device comprising an expansible fluid container engaging and directly actuated by said valve, and a fluid-actuated indicator located remotely from said valve and connected to said container, said indicator being adapted for operation in response to the valve-actuation of said container, to indicate continuously, the displacement positions of said valve, including positions of said valve beyond merely full-open and full-closed positions relative to the port controlled thereby.

2. An indicator device of the character described, for use with a fluid-pressure responsive valve mechanism including a valve chamber having a fluid port, a valve element displaceable therein substantially beyond merely a full-open or full-closed position relative to the port, and a coiled valve spring in the chamber, acting on the valve element to urge the same in one direction of its displacement, the indicator device comprising an expansible fluid container arranged within the coils of the valve spring in engagement with the valve element for actuation thereby, and a fluid-actuated indicator located remotely from the valve mechanism and connected to said container, said indicator being adapted for operation in response to the valve-actuation of said container, to indicate continuously, the displacement positions of said valve element, including positions of the valve element beyond merely full-open and full-closed positions relative to the port controlled thereby.

ARNOLD N. ANDERSON.